United States Patent [19]

Alvarez-Sabater

[11] 4,232,953

[45] Nov. 11, 1980

[54] GRAVITY-FEED ROTARY TRAY SLIDE PROJECTOR

[76] Inventor: Fernando Alvarez-Sabater, P.O. Box 3628, Caracas 101, Caracas, Venezuela

[21] Appl. No.: 52,952

[22] Filed: Jun. 27, 1979

[51] Int. Cl.³ .................... G09F 11/30; G03B 23/02
[52] U.S. Cl. ...................................... 353/111; 40/511
[58] Field of Search ............. 353/111, 112, 113, 107; 40/511, 473, 476

[56] References Cited

U.S. PATENT DOCUMENTS

| | | | |
|---|---|---|---|
| 1,412,885 | 4/1922 | Mottet | 40/511 |
| 2,748,653 | 6/1956 | Pollan et al. | 353/107 |
| 3,343,454 | 9/1967 | Mahoney | 353/107 |
| 3,402,489 | 9/1968 | Schlessel | 206/316 |
| 3,469,910 | 9/1969 | Badalich | 353/117 |
| 3,680,953 | 8/1972 | Rube | 353/117 |
| 3,874,788 | 4/1975 | Thorn et al. | 353/111 |
| 4,105,317 | 8/1978 | Sobotta | 353/117 |

FOREIGN PATENT DOCUMENTS 2306153 8/1974 Fed. Rep. of Germany ........... 353/112

*Primary Examiner*—Steven L. Stephan
*Attorney, Agent, or Firm*—Fleit & Jacobson

[57] ABSTRACT

A slide projector for projecting slides, which may be transferred into the registry with projection aperture and out of the registry with the projection aperture, solely by the force of gravity, without the need for any mechanical slide transferring apparatus. A rotary slide tray is vertically arranged with the slides in a radial orientation, and the rotary slide tray is arranged over a central hub portion having a vertically arranged projection passage formed therein. Upon rotating the rotary slide tray, slides are permitted to radially drop from the tray by the influence of gravity into the projection passage and will be caused to back-up in the passage, since they are falling entirely through the slot and resting upon slides already in the rotary slide tray in diametrically opposed locations. A specialized slide construction, formed as a double planar slide of two individual slides arranged having like horizontal edges arranged adjacent, is employed and successive cycles of the rotary slide tray are required in order to project both images of the double slide.

10 Claims, 6 Drawing Figures

GRAVITY-FEED ROTARY TRAY SLIDE PROJECTOR

BACKGROUND OF THE INVENTION

The present invention relates to slide projectors and, in particular, to slide projectors having a rotary tray for retaining the slides during the projection operation.

Following the invention of the positive transparency, there have been a multitude of various systems proposed to view the image on the positive transparency. Positive transparencies are known more popularly as slides. In fact, at present, slides are among the most popular forms of amateur photography. Along with this popularity, there are numerous systems commercially available to project the image of the positive transparency onto a screen, or the like, for viewing. One of the most popular types of slide projectors is the type having a rotary slide tray or magazine. As the tray rotates, the slides are removed one at a time from the tray and placed in front of a light source. Light is projected through the slide, and an objective lens system forms the image on the screen. Typical of this type of slide projector is the Kodak Carousel model. In this instance, the rotary slide tray is arranged horizontally on the top of the projector housing and, as the Carousel slide tray is caused to rotate, a slide is permitted to drop through a slot in the bottom of the magazine down between the lamp and the lens system, where it is then projected onto the screen. When the desired projection time has ended, a mechanical linkage then raises the slide back to the slot whence it came, and the magazine then is advanced to the next slide. The operation then begins anew and the slide falls under the force of gravity into the projection system.

Another type of slide projector employs a rotary magazine arranged in a vertical position in relation to the projector housing, and uses a mechanical linkage to drive the slide out of the magazine slot into the projection system. At the end of the desired projection time, the mechanical linkage then drives the slide back into the magazine, the magazine is advanced to the next slide, and the operation is repeated.

There are additional types of slide projectors not employing rotary slide trays, which merely stack the slides, one upon each other, and then advance them in a linear manner. There are also rectangular slide trays for retaining the slides, which are linearly advanced and operate in the manner of the Carousel or other vertical rotary slide tray.

While certain of the presently available slide projectors employ the force of gravity to perform a portion of the slide transfer operation, none of these slide projectors can transfer a slide from the magazine to the projection lens and back to the magazine using only the forces of gravity. Moreover, in any mechanical system requiring an electrically-driven linkage to move elements, which are as small as a photographic slide and which have loose mechanical manufacturing tolerances, binding of the linkage and/or the slide is almost certain to occur. In fact, that is the principle problem in many slide projectors, i.e., that the slides tend to hang up in the magazine or in the changing mechanism, and jamming is a frequent occurrence.

BRIEF SUMMARY OF THE INVENTION

The present invention provides a slide projector having a rotary slide tray, which feeds the slides to the projection optics system totally by the force of gravity, and then transfers the slides from the projection optics system back to the magazine, also totally by the force of gravity. A rotary slide tray or magazine is provided in a vertical orientation relative to the projector and cooperates with a central hub-like portion of the projector. The central hub portion is provided with a slide passage or projection passage and is located at the center of the rotary slide tray. The slides are loaded into the magazine only in a selected portion of the available slots and, as the magazine rotates, a slide will fall from the magazine by the force gravity into the slide passage. A projection aperture, located in the projection passage, is aligned with the slide and the projection optic system, in order to project the image on the slide. When the rotary slide tray advances one position, an empty slot in the tray should be aligned with the exit of the projection passage and the slide therein will drop, by the force of gravity, into the empty slot.

Simultaneous with this occurrence, a slot in the rotary slide tray containing a slide will be aligned with the entrance of the projection passage, and the slide will fall, from the force of gravity, into the projection passage. A slide in the projection passage will be aligned with the projection aperture, provided that either it or a preceding slide is resting on, and supported by, a slide already contained in a slot in the rotary slide tray at the exit of the projection passage.

Thus, it may be seen that by choosing the dimensions of the projection passage judiciously, that any diameter of rotary slide tray is possible, thereby greatly increasing the slide-storing capacity of the tray. The length of the projection passage from the projection aperture to the top of a slide in a slot in a rotary slide tray need only be a multiple of the slide height, and any diameter of slide tray is feasible.

The instant invention advantageously employs a projection optics system, which is located at the center of the slide magazine. In that embodiment, the lamp and condensor lens are located on one side of the projection passage and aligned with the projection aperture, and the objective lens is located on the other side of the projection slot.

Therefore, it is an object of the present invention to provide a slide projector, which feeds the slides to the projection optics system totally by the force of gravity, and which also transfers each slide from the projection optics back to the slide magazine, also totally by the force of gravity.

Another object of the present invention is to provide a gravity-feed rotary tray slide projector, wherein the projection optics are arranged at the center of the rotary slide tray.

It is another object of the present invention to provide a gravity-feed rotary tray slide projector, which employs specialized double-set slides, placed in the tray in a specific arrangement, which will double the capacity of the slide tray.

The manner in which these and other objects are accomplished by the present invention will become clear from the following detailed description of a preferred embodiment.

DETAILED DESCRIPTION OF THE PREFERRED EMBODIMENT

Figure 1:
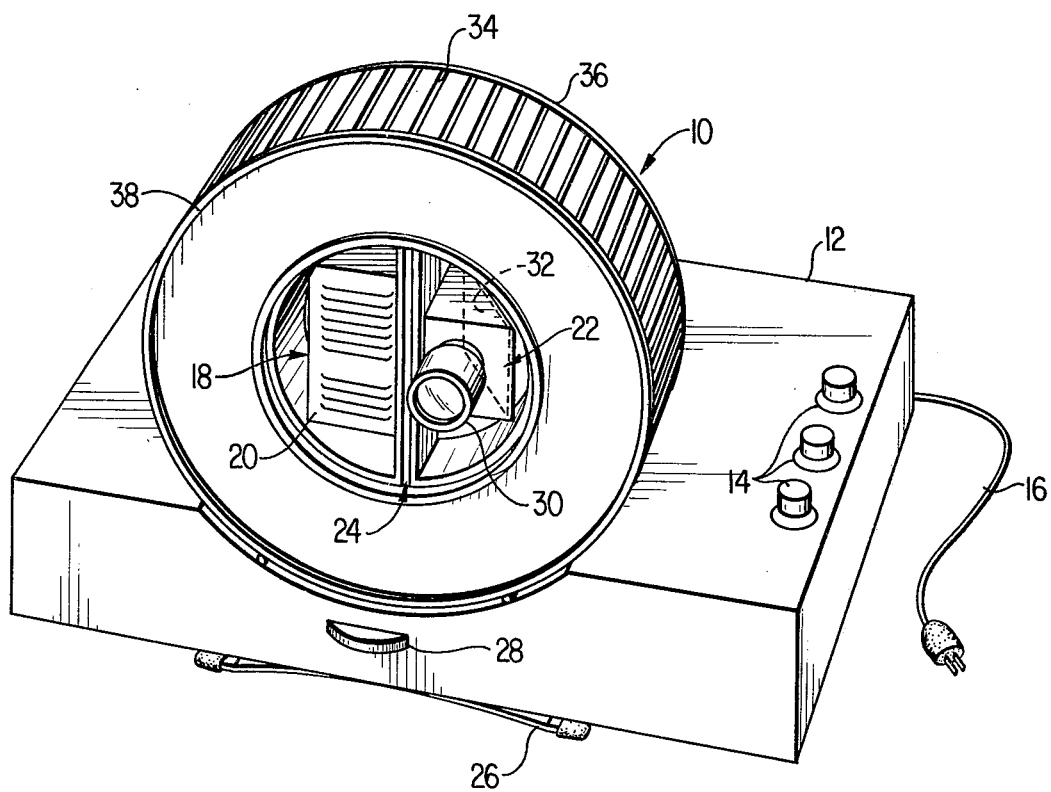
FIG. 1 is a perspective of the inventive slide projector.

FIG. 1 is a perspective of the inventive gravity-feed rotary-tray slide projector, wherein the rotary slide tray 10 is arranged in a vertical orientation, relative to the main projector housing 12, which is normally intended to be placed upon a horizontal table surface of the like. The inventive slide projector is provided with controls of the conventional type, shown typically at 14, and is intended to be powered by ordinary household current, to which it is connected by a power cord 16. The rotary slide tray 10 is arranged around a central hub portion 18, which has the projection lamp housing 20, as well as the projection optics 22, mounted therein. The central hub portion defines a projection passage 24 into which the slides are fed for projection. The projector is provided with a means to change the angle of the optical axis of the lens relative to the horizontal. Such means may comprise a foot arrangement 26, which is attached by a threaded rod to an adjustment knob 28, whereby upon rotating the adjustment knob 28, the foot 26 may be raised or lowered. In this manner, the projection angle of the lens system 22 relative to the horizontal is changed and the projector is aimed toward the screen at a different angle in relation to the horizontal. A portion of the housing 12 of the projection is relieved, so that the rotary slide tray 10 fits down into the housing 12. This serves to reduce the overall height of the inventive projector. As will be shown hereinbelow, this relieved portion contains means to aid in supporting the rotary slide tray and also serves to provide an access to a drive mechanism for rotating the tray.

The projection lens system 22 is located central to the rotary slide tray and includes a conventional objective lens 30, which may be manually focused, and a mirror 32, which serves to direct the image through the objective lens 30. The projection screen or surface must then located in front of the objective lens 30 and preferably parallel to the rotary slide tray. The slides are arranged in slots in the tray, shown typically at 34, and may be retained therein by rings 36 and 38, either or both of which may be removable to place the slides in the tray.

As will be described hereinbelow in detail, the rotary slide tray is caused to rotate, and when each slide reaches the projection passage 24, it will fall in an inwardly radial direction down into the projection passage 24. The slides are originally arranged in the slide tray 10 so that when the first slide passes through the slide passage 24, it will abut a slide already in a slot in the slide tray at the bottom of the passage 24. The slides will then be backed-up in the slot 24, until one is aligned with the projection aperture. Upon continuing the rotation of the rotary slide tray, each slide will fall by the force of gravity from the exit of the projection slot 24 and enter an empty slot in the rotary slide tray 10.

Figure 2:
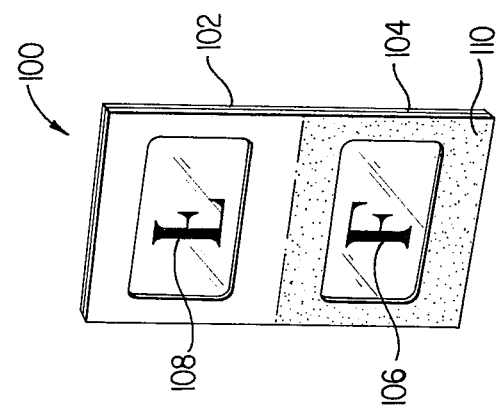
FIG. 2 is a schematic diagram of the inventive slide projector.

FIG. 2 is a schematic representation showing the principle components of the inventive slide projector system and the manner in which they are mechanically and electrically driven. The controls, 14 of FIG. 1, are shown as a block 60 and can comprise an on-off switch, a sequence or advance switch, and a fan switch, i.e., controls which are normally found in all slide projectors. The controls 60 also can serve to control the energization of rotating or advancement mechanism 62, such as a solenoid or a stepping motor, which is mechanically connected by a shaft or linkage to a tray drive 64, which is in contact with the rotary slide tray 10 and serves to advance it or back it up, depending upon the specific actuation of the controls 60. The controls 60 may also serve to energize the lamp 20, which is located central to the rotary slide tray 10. The solenoid 62 may be of simple design and in the present embodiment, a rotary solenoid and a drive gear are all that is required to advance the rotary slide tray 10. Other embodiments are equally feasible, for example, the plunger of a linear solenoid may be used in combination with a pawl and ratchet to advance the rotary slide tray 10.

Figure 3:
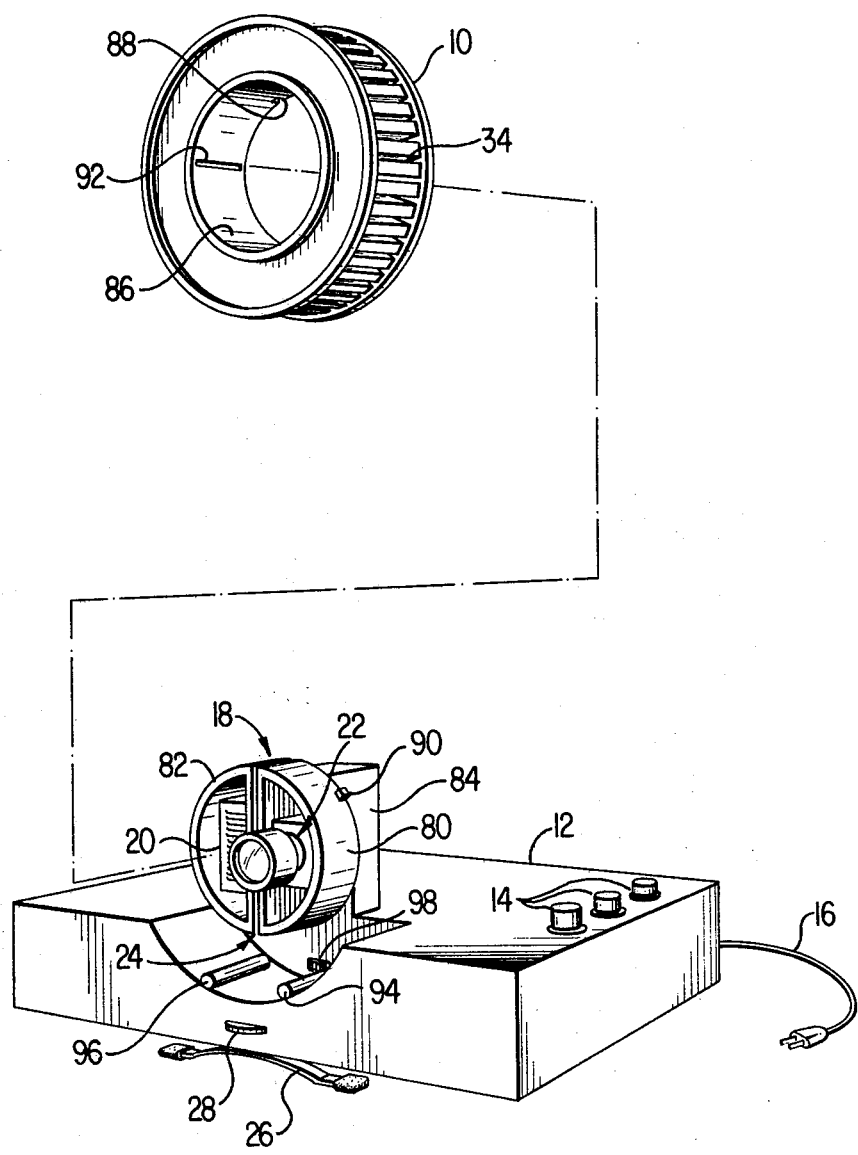
FIG. 3 is an exploded perspective of the inventive slide projector.

FIG. 3 shows the inventive rotary slide projection system having the rotary slide tray 10 removed from the projector mechanism. The tray 10 fits over the cylindrical central hub structure 18, which is formed having two semicircular portions, 80 and 82. These semi-circular portions, 80 and 82, define the projection passage 24. The central hub assembly 18 is supported by an upstanding structural member 84, which is affixed to the slide projector housing 12. The structural member 84 can contain the necessary wiring and the like to control the lamp assembly 20. This structural member 84 can be easily made to be as tall as necessary in order to accomodate any diameter of rotary slide tray.

The rotary slide tray 10 is formed with slots 34 to accept the slides, and the inner surface of the tray has a metal sleeve 86 to retain the slides in the tray. The metal sleeve 86 can rotate relative to the slide tray 10. The sleeve 86 has a notch or keyway 88 which cooperates with an indexing key 90 located on the central hub 18. The metal sleeve 86 is formed having two slots, one of which is seen at 92. The two slots are of a size to permit a slide to fit through edgewise and are located mutually diametrically opposed in the metal sleeve 86. In operation, the slide tray 10 is arranged over the center hub 18 and the key 90 indexes the keyway 88, thereby aligning slots 92 with the top and bottom openings, i.e., the entrance and exit, of slide passage 24. As the slide tray 10 is rotated, successive slides come into registry with the slots 92 and are permitted to enter and exit the slide passage 24.

In the embodiment shown, the rotary slide tray 10 rests on two idler rollers 94 and 96, which serve to support some of the weight of the loaded slide tray 10. The tray 10 is also supported, in part, by the central hub assembly 18. In this embodiment, rotary motion is imparted to the slide tray 10 by a spur gear 98, which corresponds to the tray drive 64 of FIG. 2. The spur gear 64 mates with gear teeth formed on the flat disclike surface at the back of the slide tray 10. These gear teeth are not shown in FIG. 3. As seen in FIG. 2, it is the solenoid or stepping motor, which drives the spur gear 98 in the desired direction.

As indicated above, the present invention operates to transport the slides from the rotary slide tray for projection and back to the rotary slide tray following projection, solely by means of gravity. There is no requirement for any additional mechanical drives to transfer the slides into or out of the appropriate projection slot in the slide tray.

Figure 4:
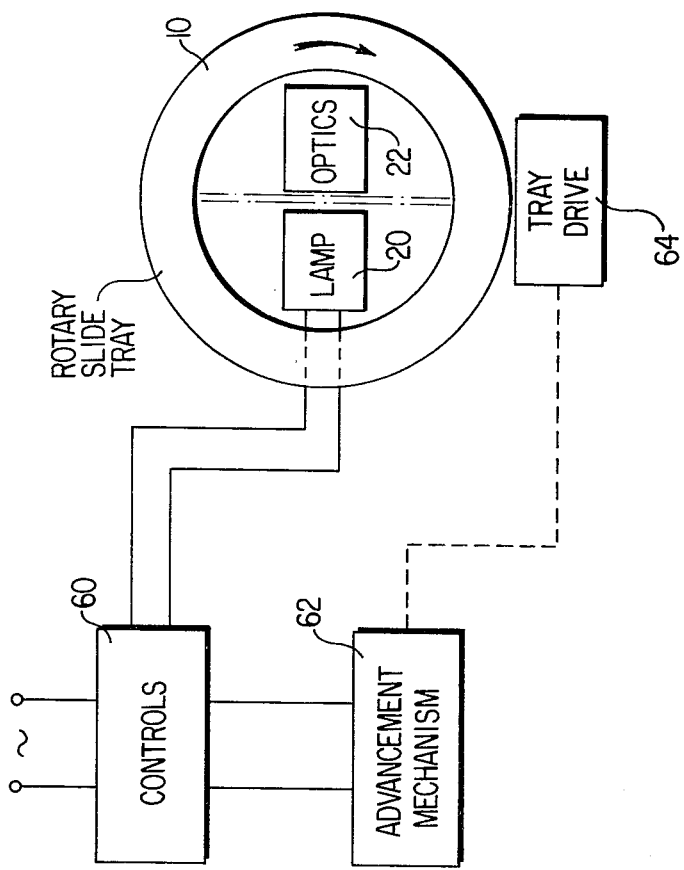
FIG. 4 is a perspective of an inventive double slide for use in the inventive projector of FIG. 1.

In the embodiment shown, the present invention further teaches that the slides may be specially constructed so as to double the effective slide-holding capacity of the inventive rotary slide tray. The inventive slide is shown in FIG. 4 at 100 and consists of two individual slides 102 and 104, arranged in a head-to-head orientation, so as to form a rectangular planar double slide. The head-to-head orientation is not critical and the slides may be arranged bottom-to-bottom. In any event, as will be seen in the description of the FIGS. 5 and 6, each combination slide 100 will be caused to enter into the projection slot of the inventive slide projector twice, in order to project all the slide images contained in the tray. Hence, the slide 100 will be "upside down" the second time it is projected. Similarly, in order to provide the correct left to right orientation of the scene, and also to project the light through the slide from the base side of the film, the slides 102 and 104 are reversed in a front-to-back orientation relative to each other. This results in the slides 102 and 104 also being in a reversed left-to-right orientation. In other words, in FIG. 4, the letter F 106 on slide 104 is in the correct left-to-right orientation, i.e., the emulsion side of the film is facing out in FIG. 2. In the slide 102, the letter 108 on that slide is in the reversed orientation and the base side of the film is facing the reader. The stippling 110 on slide 104 is presented only by way of a reference to show the orientation of a slide and is not present on a commercial embodiment. In the present example the stippling 110 corresponds to the emulsion side of the film. It should be understood that the present invention can be practiced without the requirement for the specialized slide construction, and a single slide will function correctly, provided that an optical image inverter is employed.

Figure 5:
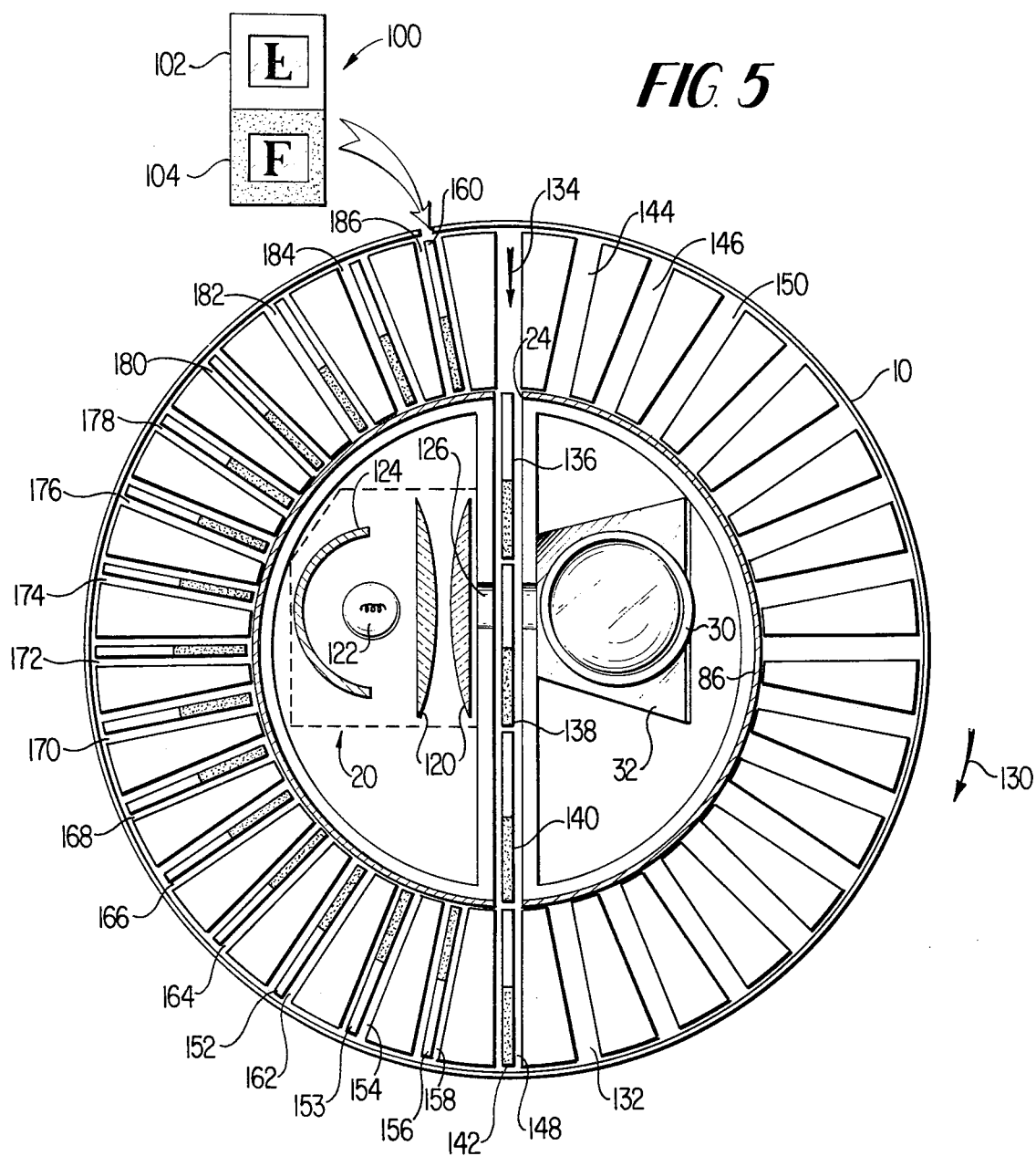
FIG. 5 is a side elevation view, partially schematic, of the inventive rotary slide tray.

Referring to FIG. 5, the lamp assembly 20 has a condensor lens pair 120 and a projection lamp 122, having a curved reflector 124, which directs the light from lamp 122 onto the condensor lens pair 120. The light is then directed through a projection aperture 126 located in both sides of the projection passage 24. The light from lamp 122 passes through the slide, if one is in the projection passage. The image is then incident upon mirror 32, which is arranged at a 45 degree angle, to direct the image through the objective lens system 30 to a projection screen (not shown), which should be arranged parallel to the rotary slide tray 10.

As seen in FIG. 5, the inside of rotary slide tray 10 is formed into a plurality of slots, which are of depth to accept the double slides 100, and have separators, which define the slots.

In the embodiment shown, the rotary slide tray 10 is intended to move in a clockwise direction, as indicated by arrow 130. As each slide comes in register with the slot 92 in the metal sleeve 86 and the projection passage 24, it will be caused to fall down into the passage 24. The slides are loaded into the tray 10 in such a manner as to provide empty slots at selected locations in the rotary slide tray, for example, the slot shown at 132 is to be left open. As the tray 10 rotates in the clockwise manner, as shown by arrow 130, successive slides will be brought into registry with the slide passage 24. As shown in FIG. 5, slide slot 134 is presently aligned with the entrance to slide passage 24, and slide 136, which was previously contained in slide slot 134, has entered the projection passage 24. This slide 136 then rests on a slide 138 already in the projection passage 24 and which was previously contained in slide slot 144. Slide 138 is resting upon another slide 140, which entered the slide passage 24 in advance of these two slides and was originally in slide slot 146. Slide 140 rests upon slide 142, which is now contained in slot 148 of the slide tray 10, and which had previously been retained in slide slot 150. Slide 142 was not originally in slide slot 148, however, and this may be easily seen, since slide 142 has the stippled portion, which was represented as slide portion 104 of the exemplary slide 100, pointing radially outwards, whereas the stippled portions of the remaining slides are all pointing radially inwards.

Figure 6:
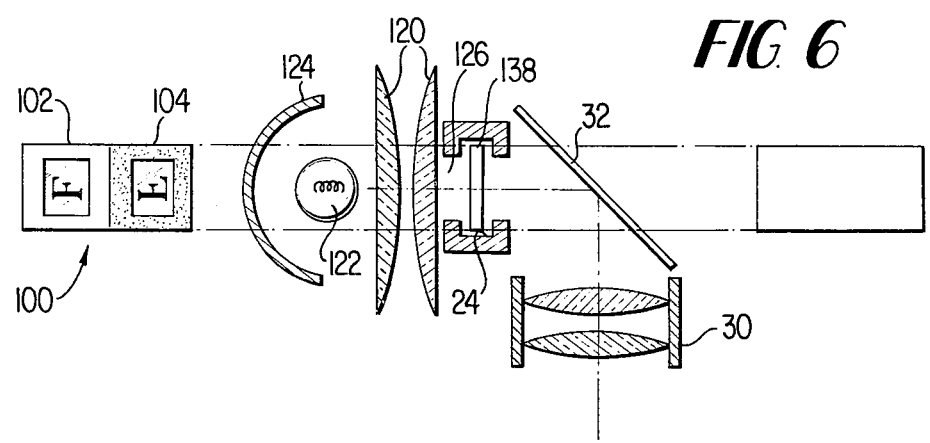
FIG. 6 is a schematic diagram of the optical system of the inventive slide projector.

FIG. 6 shows the projection portion of the inventive slide projector in a diagrammatic view and, as may be seen, the light from lamp 122 is directed by the condensor lens pair 120 through the projection slot 126 which is formed in the projection passage 24, and through the appropriate portion of slide 138. The image is then directed towards mirror 30 and is reflected through a right angle to the objective lens 32 and thence to a screen. It is not critical that the necessary mirror 30 be used, and a prism or the like could be substituted.

In operation, the inventive slide projector functions as follows. The slides are arranged in the empty slots 34 in the slide tray 10 and, in the embodiment shown in FIG. 5, slides are placed in the slots labelled 134, 144, 146, 150, 154, 158 and 162–186. The remaining slots are then left empty. The tray is placed on the central hub 18 and the notch 88 in the sleeve 86 in indexed with the key 90. The loaded tray 10 is arranged on the central hub 18 so that the first slot having a slide contained therein is only one step in a counter-clockwise direction from being in registry with the entrance of the projection passage 24. Upon energization of the solenoid 60, the slide tray 10 is advanced one slot and the slide resident in the appropriate slot will fall, solely by the force of gravity, down through the projection passage 24, and will rest upon a slide already contained in a slot in the slide tray.

In the example shown of FIG. 5, slide 142 originally entered the projection passage 24 first and fell down the passage until it rested on slide 152, which is contained in slot 164. Upon the next step in the clockwise rotation of the tray 10, slide 140 which was contained in slot 146, was brought into registry with sliding passageway 24 and fell under the force of gravity into the projection passage 24. Slide 140 at that time was resting on slide 153 contained in slot 154.

Slide 138 is formed corresponding to the general example of slide 100, shown in FIG. 4, and, hence, the nonstippled portion of slide 138, corresponding to slide 102, is in registry with the projection aperture 126. Therefore, provided that the lamp 122 is functioning properly, light will be directed through the slide 102 and the image of letter 108 will be projected in the proper orientation. After sllide 136 has entered the projection passage 24, with the next rotation of the slide tray 10, slot 132 will be brought into registry with the of exit the projection passage 24 and slide 140 will fall, solely by the force of gravity, into slot 132, thereby permitting the next successive slot 186 to be in registry with the entrance of the projection passage 24. As may be seen from FIG. 5, only one slide, i.e., slide 142, will not have one of its two slides projected in the initial sequence of 360 degree revolution of the slide tray.

It may be seen from FIGS. 4 and 5, and particularly from the stippled portions of the combination slides, that once a slide has passed through the projection passage 24, it then becomes reversed in relation to its orientation towards the center of the slide tray. In other words, slide 142 has the portion corresponding to slide 104 facing radially outwards, while all other slides still in their slots have the portion corresponding to slide 104 facing radially inwards. This has the effect that after the slide tray 10 has been rotated a sufficient number of steps to bring slide 142 in slot 148 registry with the entrance of the projection passage 24, such that it may fall downwardly, that it will then fall with the portion of the slide corresponding to slide 102 in an inwardly facing manner. Thus, the portion corresponding to slide 104 will be ultimately brought in alignment with the projection aperture 126. This has the effect that after two cycles of the tray, both of the elements which make up the combination slide, will be projected onto the screen.

As indicated above, since slide 142 fell through the passage in the initial start-up, without having any portion projected, the projection operation should continue one last step, so that the portion of this slide corresponding to slide 102, will be viewed as the very last slide in the projection series.

It is understood, of course, that the foregoing description is presented by way of example only and is not intended to limit the scope of the present invention. Various other embodiments are contemplated by the present invention. For example, the projector could also be built with the slide tray in a frontal position such that the direct projection does not require a mirror or prism for reflecting the light. However, this embodiment would reduce the number of slides which are able to be handled.

Additionally, another modification might be that the double inventive slides could be eliminated and conventional single slides could be used. In such a model, however, a prismatic image inverter would be required in the projection slot so that the prism could selectively invert the image at the beginning of every cycle. This image inverter is necessary because as the slides pass through the projection slot they become inverted top to bottom and, hence, the slide must be optically inverted in order to project an upright image. The only limitations intended to the present invention are as set forth in the appended claims.

What I claim is:

1. In a combination slide projector and rotary slide tray wherein the slide projector includes lamp means for illuminating a slide, projection optics means for projecting an illuminated slide, and means for rotating the rotary slide tray, and wherein the slide tray has slots for receiving radially arranged slides for projection, the improvement comprising:

said slide tray having diametrically opposed slots arranged vertically, and said projector having a fixed central portion positioned inside the tray, said lamp means and projection optics means being arranged on the fixed central portion of the projector at the center of said rotary slide tray;

a slide passage in said fixed central portion having an entrance and an exit, each of which can be in simultaneous registry with diametrically opposed slots in said rotary slide tray containing said slides, said slide passage being arranged between said lamp means and said projection optics means and having a projection aperture located therein and aligned with the optical axis of said lamp means and said projection optics means;

said slides to be projected being planar double slides formed of two individual single slides, each having a photographic image thereon and being arranged with like horizontal edges adjacent each other; and said slides being contained in said slots in a predetermined pattern such that not all available slots contain a slide; whereby, upon causing said vertically arranged rotary slide tray to rotate, said slides are caused to drop from said rotary slide tray under the force of gravity into the entrance of the passage and to abut slides already in slots in the rotary slide tray such that one image of said double slide is aligned with said projection aperture and the image thereon is projected, and upon further rotation of said rotary slide tray, said slide will fall under the force of gravity into an empty slot in said rotary slide tray.

2. The combination slide projector and slide of claim 1, wherein said projection optics means comprises a mirror arranged to direct light passing through said projection aperture at an angle so as to enter an objective lens system arranged having its axis parallel to the central axis of said rotary slide tray, whereby the image projected by said slide projector falls on a surface parallel to the rotary slide tray.

3. The combination slide projector and slide of claim 1, wherein said slide passage is formed having a length in relation to the length of said double slide such that the slide being projected rests upon another slide in the passage which in turn rests on another slide in a slot in the tray.

4. The combination slide projector and slide of claim 1, wherein the means for rotating said rotary slide tray is a solenoid.

5. Means for projecting slides, comprising:

a base;

a central hub portion mounted on said base, said central hub portion having a vertically arranged slide channel having an entrance and an exit, and a projection light source mounted on said central hub portion on one side of said channel and a projection optics means mounted on said central hub portion on the other side of said channel, said channel having a projection aperture formed therein aligned with the optical axis of said projection light source and said projection optics means;

a rotary slide tray vertically arranged around said central hub portion having slots therein for containing slides in a radial orientation, said slide tray being formed such that diametrically opposed slots are simultaneously in registry with either end of said slide channel;

planar slides bearing at least one photograhic image arranged in a predetermined pattern in said slide tray; and means for causing said rotary slide tray to rotate on said central hub portion; whereby, upon said rotary slide tray being rotated, said slides are caused to enter the entrance of said slide channel and to abut initially slides already in slots in the rotary slide tray so as to back-up until one of said slides is aligned with said projection aperture, and the image contained on said slide is projected, and with each advance of said rotary slide tray one slide enters the entrance of the slide channel solely by the force of gravity and one slide leaves at the exit of the slide channel into said slide tray slot, solely by the force of gravity.

6. The means for projecting slides of claim 5, wherein said projection optics means comprises a mirror arranged in front of said projection aperture at an angle such that light passing through said projection aperture is directed onto an objective lens which is arranged having its optical axis parallel to the central axis of said rotary slide tray.

7. The slide projecting means of claim 5, wherein said planar slides are formed as double slides formed of individual single slides, each having a photographic image thereon and being arranged to form a planar double slide having like horizontal edges located adjacent each other.

8. The slide projecting means of claim 5, wherein said means for rotating said rotary slide tray is a solenoid.

9. The slide projecting means of claim 5, wherein said means for rotating said rotary slide tray is a stepping motor.

10. Means for projecting slides, comprising:
a base;
a central hub portion mounted on said base, said central hub portion having a vertically arranged slide channel having entrance and exit ends, and a projection light source mounted on said central hub portion on one side of said channel and a projection optics means mounted on said central hub portion on the other side of said channel, said channel having a projection aperture formed therein aligned with the optical axis of said projection light source and said projection optics means;
a rotary slide tray vertically arranged around said central hub portion having slots therein for containing slides in a radial orientation, said slide tray being formed such that said slots are brought into registry with ends of said slide channel during rotation of the slide tray around the central hub portion;
planar slides bearing at least one photographic image arranged in a predetermined pattern in said slide tray; and
means for causing said rotary slide tray to rotate on said central hub portion; whereby, upon said rotary slide tray being rotated, said slides are caused to leave the slide tray and enter the entrance end of said slide chanel solely by the force of gravity and to abut initially slides already in slits in the rotary slide tray so as to back-up until one of said slides is aligned with said projection aperture, and the image contained on said slide is projected, the slides leaving the exit of the slide channel and entering said slide tray slot solely by the force of gravity.

* * * * *